United States Patent [19]
Gill

[11] Patent Number: 4,687,375
[45] Date of Patent: Aug. 18, 1987

[54] CIRCULAR HEADING MACHINE

[75] Inventor: Arthur Gill, Dunblane, United Kingdom

[73] Assignee: Anderson Strathclyde PLC, Glasgow, Scotland

[21] Appl. No.: 729,731
[22] PCT Filed: Aug. 17, 1984
[86] PCT No.: PCT/GB84/00285
§ 371 Date: Apr. 25, 1985
§ 102(e) Date: Apr. 25, 1985
[87] PCT Pub. No.: WO85/01081
PCT Pub. Date: Mar. 14, 1985

[30] Foreign Application Priority Data
Aug. 20, 1983 [GB] United Kingdom ......... 8322468

[51] Int. Cl.⁴ .................. E21D 9/08; E21D 11/40; E21C 29/02
[52] U.S. Cl. .................. 405/146; 299/31; 299/33
[58] Field of Search ............ 299/33, 31; 405/146, 405/150

[56] References Cited
U.S. PATENT DOCUMENTS

| | | | |
|---|---|---|---|
| 2,385,251 | 9/1945 | Ayers | 405/146 |
| 3,061,288 | 10/1962 | Robbins | 299/31 |
| 3,266,257 | 8/1966 | Larrouze et al. | 299/31 |
| 3,828,862 | 8/1974 | Dabell et al. | 405/150 X |
| 3,972,200 | 8/1976 | Scarpi | 405/150 X |
| 4,077,670 | 3/1978 | Spies et al. | 299/33 X |
| 4,136,910 | 1/1979 | Plummer | 299/31 |
| 4,263,005 | 4/1981 | Sigott et al. | 405/150 X |

FOREIGN PATENT DOCUMENTS

| | | | |
|---|---|---|---|
| 2257059 | 5/1974 | Fed. Rep. of Germany | 299/31 |
| 2530988 | 12/1976 | Fed. Rep. of Germany | 299/31 |
| 2727836 | 1/1978 | Fed. Rep. of Germany | 299/33 |

Primary Examiner—Stephen J. Novosad
Assistant Examiner—Michael A. Goodwin
Attorney, Agent, or Firm—Mason, Fenwick & Lawrence

[57] ABSTRACT

A circular heading machine for excavating tunnels by advancing a machine in stepwise fashion and erecting tunnel supports, having an elongate machine body at the forward end on which a forwardly directed cutter boom is mounted. Rams advance the machine body in stepwise fashion acting against grippers and a profile ring limits peripheral movement of the cutter boom to form an accurate profile. A gathering apron is provided at the forward extremity of the machine body. The cutter boom is mounted on a sliding carriage longitudinally movable on and independently of the machine body and a hood overlies the apron. A cage structure extends rearwardly from the hood structure and surrounds the body cutter and sliding carriage and tunnel support erecting members are provided externally of the cage structure, directly behind the hood structure. The hood is a semi-circular member supported by hydraulic rams for height adjustment.

7 Claims, 9 Drawing Figures

CIRCULAR HEADING MACHINE

This invention relates to circular heading machines for excavating tunnels.

It is well known to cut tunnels by advancing a machine in step-wise fashion and to erect tunnel supports behind the machine. However, as these supports are behind the machine, the machine itself is protected by some other means such as shields, but shields can become trapped by convergence, especially in deep mining and consequently tunnelling can be delayed while the shield is freed.

An object of this invention is to obviate or mitigate the aforementioned disadvantage.

According to the present invention there is provided a circular heading machine comprising an elongate machine body having at its forward end a forwardly directed cutter boom mounted thereon, means to advance the machine body in step-wise fashion, means to limit peripheral movement of the cutter boom to form an accurate profile and a gathering apron at the forward extremity of the machine body, characterised in that the cutter boom is mounted on a sliding carriage longitudinally moveable on and independently of the machine body, a hood overlies the apron, a cage structure extends rearwardly from the hood structure and surrounds the boom cutter and sliding carriage and means are provided externally of the cage structure, directly behind the hood structure for erecting circular tunnel support structures over the machine body, erection of the tunnel support structures taking place simultaneously with operation of the cutter.

Preferably, the hood is a semi-circular member supported by hydraulic rams for height adjustment.

An embodiment of the present invention will now be described, by way of example, with reference to the accompanying drawings in which.

Figure 8:
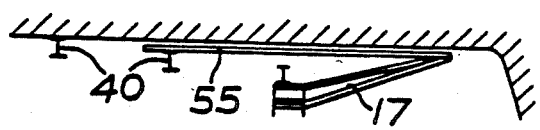

FIG. 8 a detail illustrating a trailing arm.

The circular heading machine has an elongate body 10 which mounts a cutter boom 11 at its forward end, the boom 11 being carried on a sliding carriage 12 which is slidably moveable on the machine body 10 by thrust jacks 13. The cutter boom 11 carries a conical cutter head 14, by which a tunnel 15 can be excavated; movement of the boom is manually controlled via tilting jacks 11A and slewing jacks 11B, by an operator seated in the sliding carriage.

Figure 1:
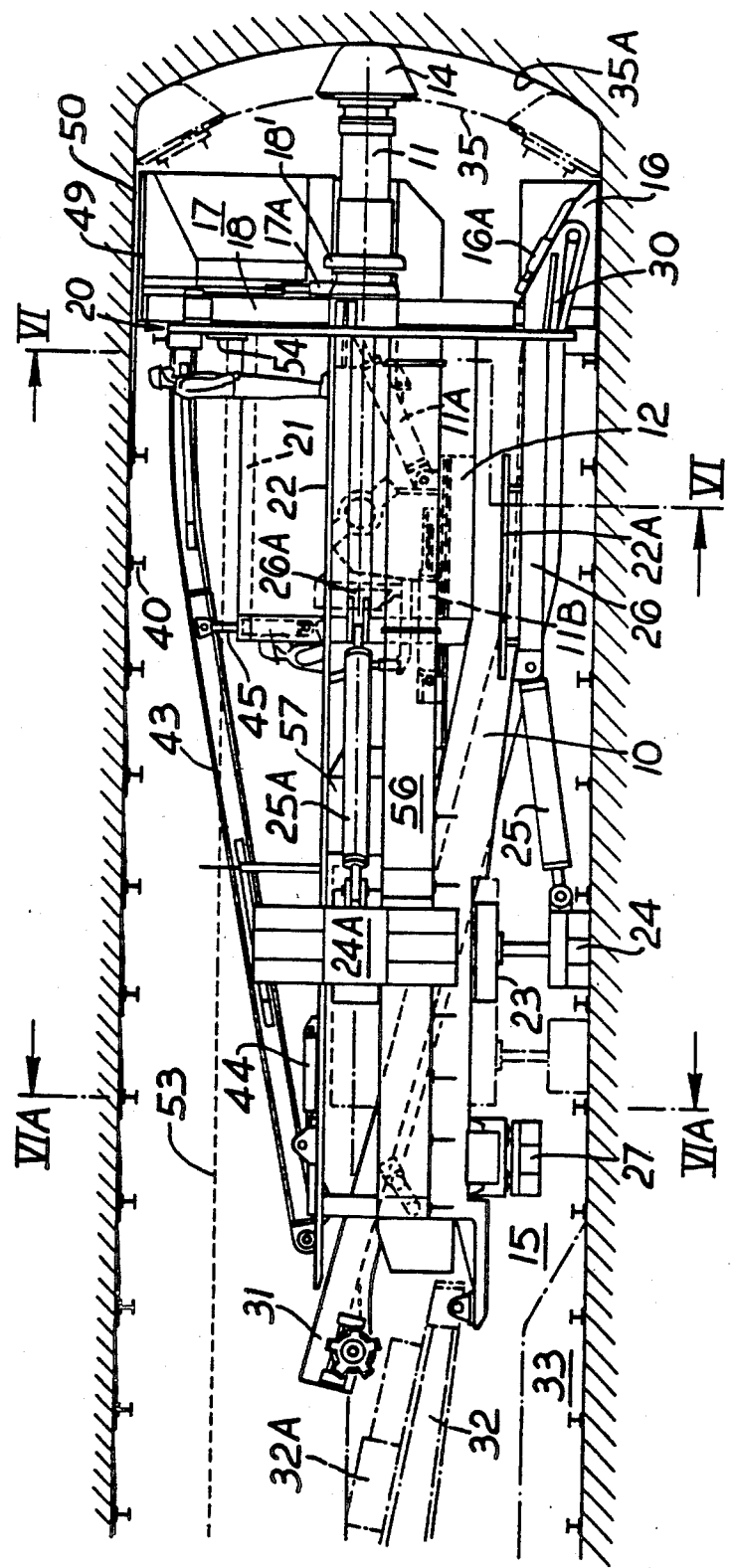
FIG. 1 is a side elevation of a circular heading machine according to the invention.
Figure 2:
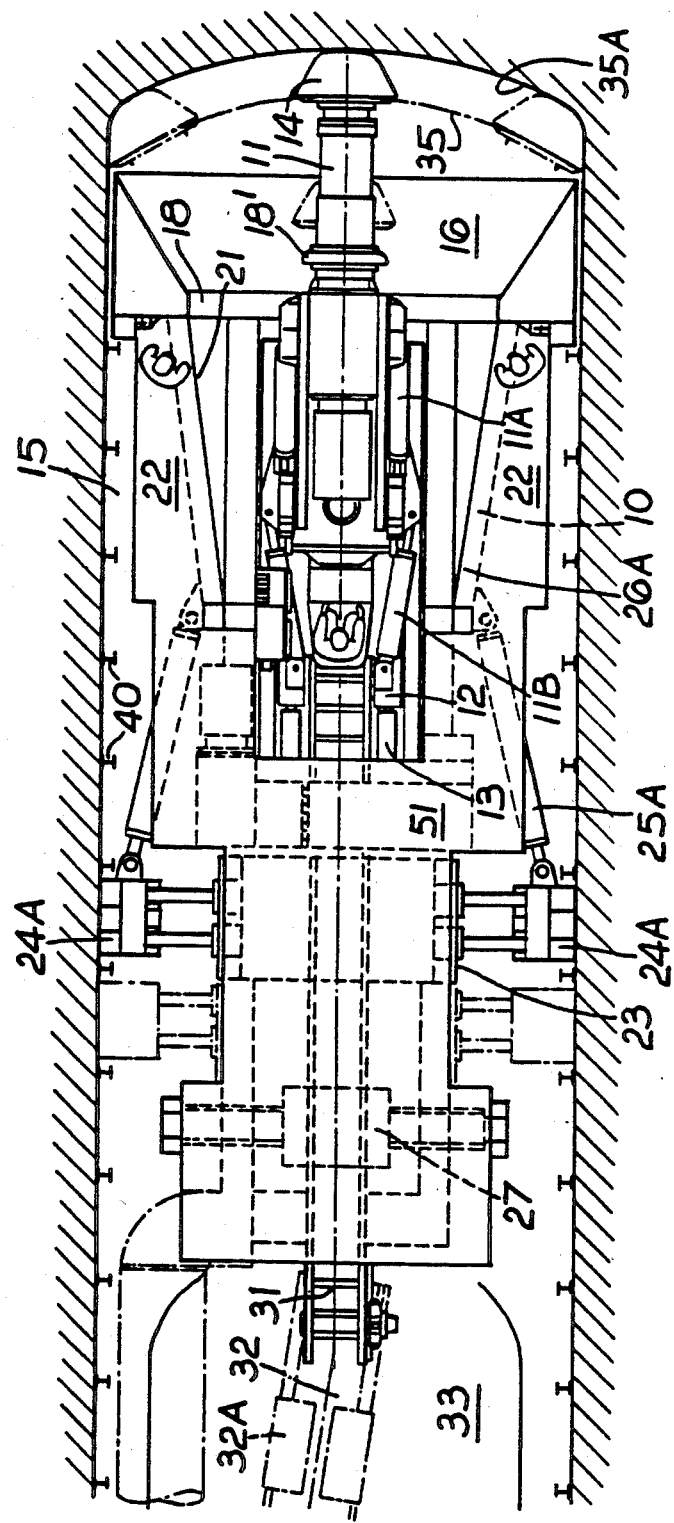
FIG. 2 is a plan view of FIG. 1.
Figure 3:
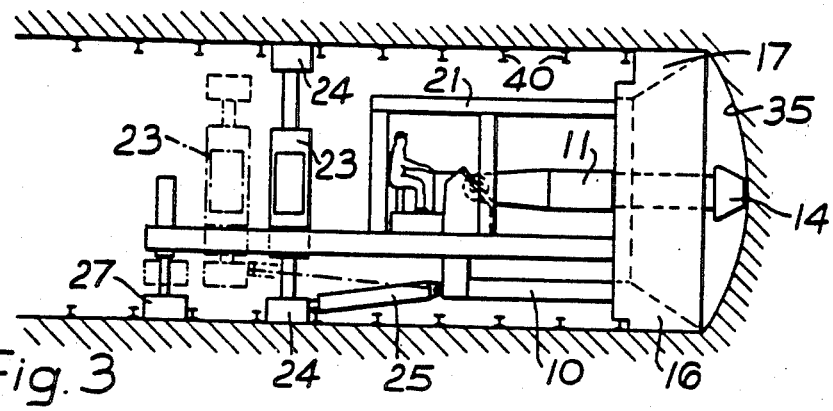
Figs. 3 to 5 are side elevations of the machine illustrating, with FIG. 1, the cycle of operation.
Figure 4:
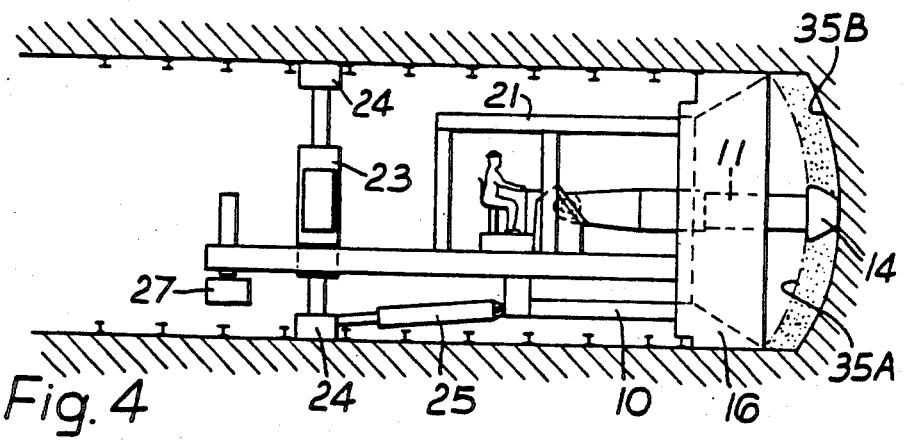
Figure 5:
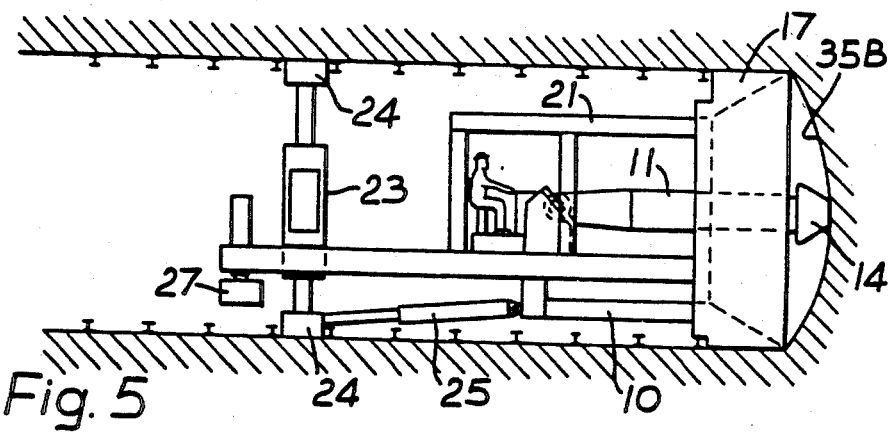
Figure 7:
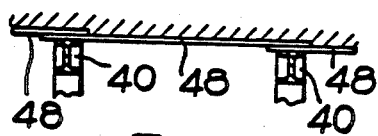
FIG. 7 is a detail illustrating lagging between the tunnel supports.

At the forward extremity of the machine body there is a gathering apron 16 of semi-circular form which carries windmill or gathering arms 16A and above the apron there is a semi-circular hood 17; this hood forms a stone/dust guard as illustrated in FIG. 1 for use as a temporary roof support if required and it may be provided with trailing fingers (FIG. 8) as hereinafter described.

The hood is supported by hydraulic rams 17A which serve to lower the hood if necessary for the insertion of lagging strips 45 (FIG. 6) hereinafter described and to permit controlled lowering of the hood in the event of severe convergence or collapse of the roof.

The apron and hood converge rearwards and terminate in a profile guidance ring 18 and on the cutter boom there is a profile collar 18' which can run round the inner face of the ring 18 thus limiting the movement of the boom.

Figure 6:
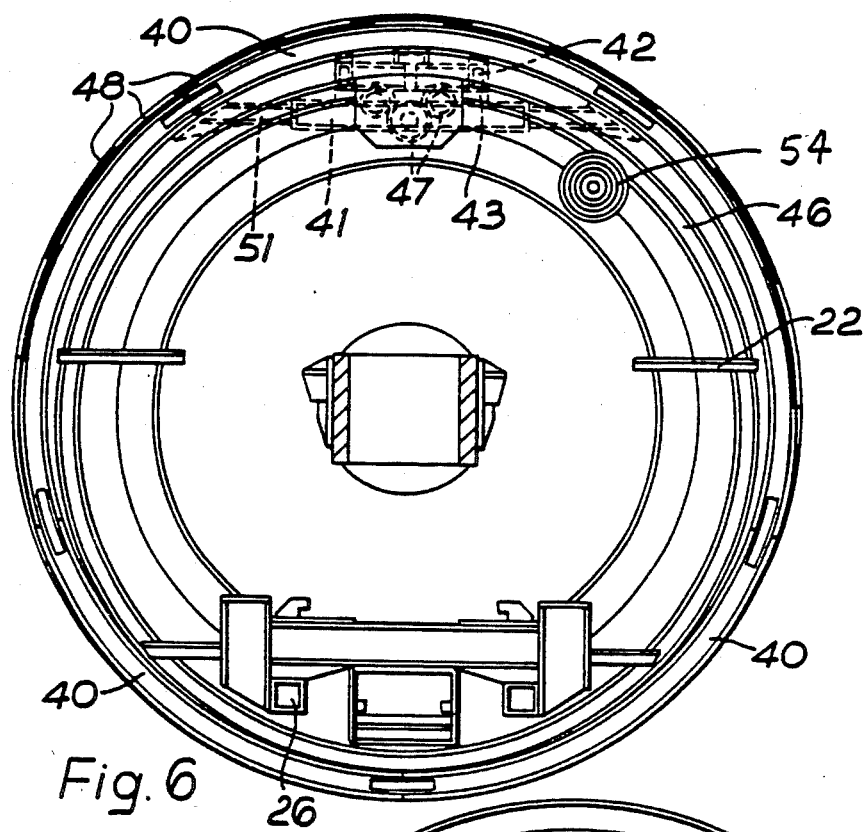
FIG. 6 is a rear elevation of the lines VI—VI of FIG. 1 showing tunnel support erection apparatus.

Immediately behind the apron/hood structure is a tunnel-support mechanical erection apparatus 20 by which ring girders can be erected over the machine body as hereinafter described with reference to FIG. 6.

A cage-structure 21 is provided on the machine body below the level of the top of the hood 17 to enclose the boom 11 and carriage 12 and the support erection apparatus 20 is external of the cage 21. Tunnel support erectors can therefore work in safety on a platform 22 on the machine body even while the cutter 14 is in operation.

Towards the rear of the machine body 10, a radial gripper mechanism 23 is provided having three segmental grippers 24 which are radially extendible to engage the sides and floor of the excavated tunnel. Thrust jacks 25 and 25A are connected between the lowermost gripper 24 and an underframe 26 on the machine body 10 and between side grippers 24 and longitudinal beams 26A also on the machine body. When the grippers 24 are firm against the tunnel, the jacks 25 and 25A can extend to push the machine body forward; when the grippers are retracted the jacks 25 and 25A can be retracted to draw the gripper mechanism 23 forward.

Rearward of the gripper mechanism a segmental support leg 27 is mounted on the machine body 10 and is extended downwards to engage the tunnel floor when the gripper mechanism is to be retracted and when the side grippers are being adjusted to align the machine transversely, thus to hold the machine in its existing vertical alignment. The support leg 27 is part of a centering structure 27A which is transversely slidably mounted in the machine body 10 and includes side jacks 27B. The jacks 27B operate sequentially with support leg 27 to ensure that the latter is automatically centralised in the tunnel before engaging the tunnel floor.

To achieve this the side jacks 27B which are hydraulic jacks are connected through an equal split flow divider so that their flows are equal; thus if one jack engages the tunnel wall first, it will push the entire jack structure transversely relative to the machine body away from that side until the other side jack engages its side of the tunnel, after which the support leg 27 will be in a centered position relative to the tunnel. Once the support leg has been lowered, the rear end of the machine body can be transversely adjusted via the side grippers 24 to give accurate directional positioning of the machine required, as hereinafter explained.

The machine body carries an integral scraper chain conveyor section 30 which runs from the gathering apron, under the machine body then upwardly towards the rear end, exiting in a rearward extension 31 beyond the machine body for transfer of excavated minerals to a bridge conveyor 32 trailed by the machine. The bridge conveyor is aligned below conveyor extension 31 and on the former is slidably mounted a deflector structure 32A which when in one position is clear of material dropping on to the bridge conveyor 32 and when in the other position deflects the material on to the floor at the side of the bridge conveyor to create an infill 33 when required. The machine operates in cycles as illustrated in FIGS. 1 and 3 to 5, and described hereinafter.

Tunnel support erection is carried out by erectors working on the platform 22 situated immediately behind the apron/hood structure so that the supports are erected over the machine body and in advance of the boom operator. A secondary platform 22A is provided on each side for erectors to fit tie rods 52 hereinafter described.

Segments of ring girders 40 (FIGS. 1 and 6) are delivered, e.g. by monorail (not shown) to the rear of the machine and delivered therefrom via a hydraulically driven chain hauled carrier 41 (FIG. 6) running via wheel 42 on a longitudinal structure 43 overlying the machine body to the erection area behind the hood 17. Structure 43 is bodily adjustable longitudinally and vertically relative to the machine body 10 by hydraulic rams 44 and 45 (FIG. 1) to manipulate the ring supports into position. At the erection area directly behind the apron/hood all but one of the segments 40 are mounted in turn on the mechanical erector 20 which is a framework carrying a circular chain 46 (FIG. 6) driven by sprockets 47 then jointed and hauled round the tunnel perimeter until an almost complete but collapsed ring has been built. Over the top half section lagging in the form of wire mesh panels or corrugated sheets 48 is introduced between the last panel of lagging and the new collapsed ring girder by inserting them alternately into arcuate slot 49 and space 50 and raising them to overlap the previous set.

Those sections of the ring girder now in position are expanded by the manoeuvring adjustment of structure 43 to trap the lagging 48 and to meet the perimeter of the lower part of the tunnel; thus the final section of the ring girder is placed in position on carrier 41 and by advancing the carrier is presented against the as yet unexpanded ring portions already in position. At this stage adjustable legs 51 of the carrier 41 are manually brought out and locked against the ends of the positioned sections 40 and the entire structure 43 is lifted by hydraulic rams 45 to expand the positioned sections radially to provide room for the final section which is advanced into position either by moving structure 43 bodily forward using hydraulic rams 44 or by advancing carrier 41 or both.

A ring expansion joint (not shown) is then fitted and to give extra tunnel support the machine is designed to allow this expansion joint to be located in different positions on adjacent ring girders so that the weakest point in the girder is not always in the same relative position.

Figure 6A:
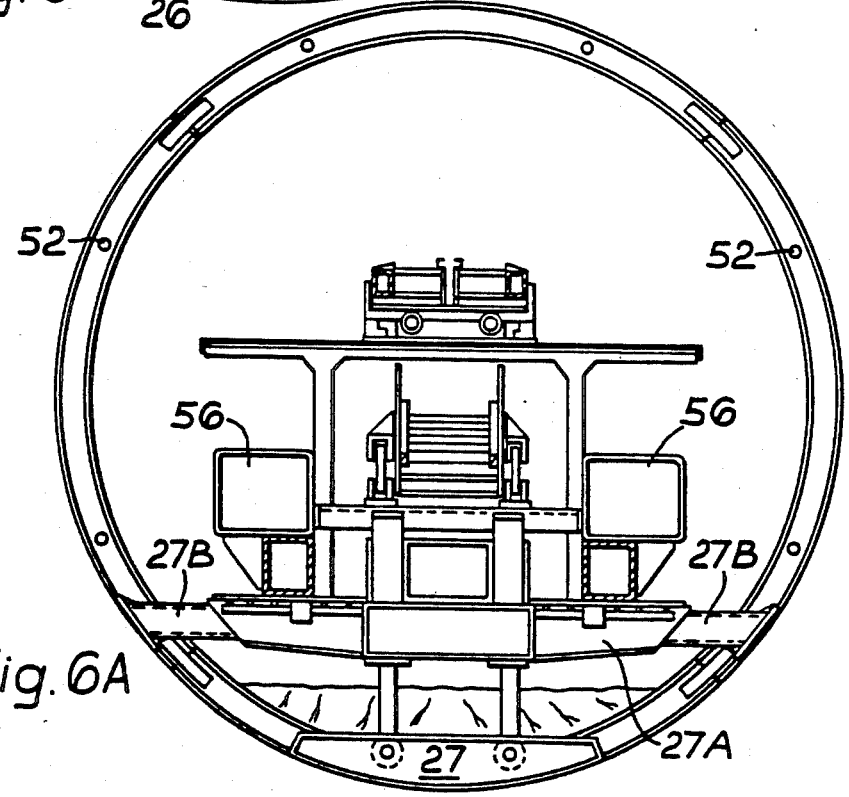
FIG. 6A is a rear elevation of the lines VIA—VIA of FIG. 1 showing the rear support leg.

The tie rods 52 (FIG. 6A) are loosely bolted to the previous ring and the entire new ring is drawn back on carrier 41 by the hydraulic rams 44 to abut against the tie rods.

The new ring is then loosely bolted to the tie rods after which a final expansion of the new ring is carried out using known methods, e.g. mechanical screw jacks and final tightening of the bolts is made.

Cycle

The machine operates in cycles as illustrated in FIGS. 1 and 3 to 5 (in the latter Figs. the jacks 25A are omitted for reasons of clarity).

Before beginning the cycle and with the entire machine advanced to the face:

1. The boom sliding carriage 12 is in its retracted position so that the cutter 14 is just clear of the mineral face.
2. The side jacks 27A are extended to automatically centre the lower support leg 27 in the tunnel and then lower it to the floor.
3. The gripper mechanism 23 is retracted (chain lines) and drawn forward by retraction of the thrust jacks 25 and 25A.
4. The transverse alignment of the machine 10 is checked by known methods of alignment, e.g. laser beams 53 and target 54 on the machine and if necessary set to its correct position by pushing with the left hand or right hand wall gripper 24A against the tunnel wall thus sliding the machine across the centering structure 27A which is firmly located against the tunnel wall.
5. The wall grippers 24A are then retracted and the floor gripper 24 is lowered followed by retraction of the lower support leg 27 and side jacks 27A and the vertical alignment is checked by the same means as (4) above using the floor gripper.
6. With the floor gripper 24 still in position both side grippers 24A are then set hard against the tunnel walls.
7. Lagging 48 (FIG. 6) is introduced into arcuate slot 49 and into the space 50 between the hood 17 and the roof and a ring girder 40 is assembled and expanded finally thus trapping this lagging between girder and tunnel. The machine is now ready to cut into face 35.
8. The cutter boom carriage is advanced to sump-in the cutter head and excavate to a depth of 0.5 meter (FIG. 1). The head can move universally within the limits set by the profile ring 18 and forms a circular hole slightly in excess of the required tunnel diameter with a new mineral face 35A.
9. Whilst this operation is in progress a set of ring segments are brought forward from the rear, loaded into the erector 20 and carried round into position.
10. After that excavation, the cutter boom carriage is retracted and the machine advanced 0.5 meter carrying the partially assembled ring in the erector with it to once again present the cutter head to the mineral face now 35A. During this time the lagging 45 covers the 'exposed' ground by bridging between the initial set ring and the hood.
11. The carriage is then advanced again (FIG. 4) to sump in and excavate another 0.5 meter to form a new mineral face 35B.
12. After that excavation the carriage is retracted and the machine advanced a further 0.5 meter (FIG. 5) thus having achieved the first 1.0 meter advance of the machine.
13. The cycle for 1.0 meter advance is now completed with the cutter 14 just clear of the mineral face 35B. The gripper mechanism 23 is released, drawn forward and repositioned.
14. The cycle can now be repeated but steps 7 and 8 are combined so that in the process of excavating the next 0.5 meter, lagging is positioned around the hood again to overlap the existing lagging, the last ring segment is loosely fitted, and the tie rods 52 are secured between the first and second rings as previously described. The entire ring is positioned by manoeuvring structure 43 then expanded finally into position.

In an alternative hood construction, FIG. 8 rearwardly extending fingers 55 are resiliently connected to the front edge of each hood plate 17 and extend back by such a length that they overlie not only the ring girder being erected but also the last fully erected ring girder. When the machine reaches the end of its cycle, the structure 43 is manoeuvred to position the ring girder being erected and during the new cycle when the machine is pushed forward the trailing fingers are drawn clear of the previously last erected ring girder to overlie the new last erected ring girder.

Dust extraction ducts 56 are fastened to the machine body whereby when air is blown into the tunnel and over the machine, dust from the excavation will be drawn into the top of hood 17 and through the ventilation ducts 56 to exit from the rear into a dust collection unit (not shown) thus enabling the erectors to operate in a relatively dust free atmosphere.

A hydraulic power pack 57 can be trailed behind the machine or, as illustrated in FIG. 1 located on the machine body and is used to power all the machine's functions.

In the preferred embodiment three radial grippers 24 are provided, i.e. the two side grippers plus the floor gripper. However, should conditions require it, a fourth gripper may be added to engage the roof in conjunction with the side and floor units. There are removable parts in the gripper shoes 24 which allow the grippers to 'straddle' the ring girders if any increase or decrease in ring density is required.

In addition the apron 16 and hood 17 have alternative bolting positions so that tunnels of varying diameters within the limits of plus or minus 0.25 meters from the norm may be worked.

An advantage of the circular mining machine as hereinbefore described is that it allows erection of the tunnel support structure over the machine rather than behind it, thus reducing the 'prop-free front distance', i.e. the distance between the cut face and the last permanent tunnel support. Further in the event of convergence, the only part of the machine that can become trapped is the hood 17, and another advantage, due to the feature of the boom carriage being moveable independently of the machine, is that in the event of sudden convergence trapping the machine against further forward movement, the cutter can be advanced to cut a chamber and the mineral cut thereby can then be removed by hand by personnel gaining access to the mineral through the cage and apron/hood.

A further advantage of the circular heading machine as hereinbefore described is its economic rate of advance, cutting 1 meter in each cycle in two cuts of 0.5 meter, while simultaneously allowing support erection operations to be carried out in safety.

I claim:

1. A circular heading machine comprising: an elongate machine body, means to advance said body in stepwise fashion, a carriage mounted on top of the machine body and slidably moveable thereon longitudinally and independently of the stepwise movement of the machine body, a forwardly directed cutter boom mounted on the sliding carriage and manually controlled from an operative position on the sliding carriage, a cage structure surrounding the sliding carriage, and means for erecting tunnel support structures over the machine body, the erecting means being provided externally of the cage structure whereby the cutter boom operative can operate the cutter boom during erection of the tunnel support structures so that erection of the tunnel support structures and operation of the cutter can take place simultaneously as the machine advances in stepwise fashion.

2. A machine according to claim 1, wherein a centering structure is mounted on the rear end of the machine body transversly moveable relative thereto and comprises a pair of laterally extendable members for engagement with the tunnel wall and a depending member to engage the tunnel floor, said lateral members having an equalizing displacement so that the depending member is positioned centrally relative to the tunnel before it is lowered to engage the floor and in which position it provides a datum point for accurately directional-positioning of the machine.

3. A machine according to claim 1 or 2 wherein the means to advance the machine body comprises in combination a radial gripper means mounted on and longitudinally moveable relative to the machine body and thrust means connected between the gripper means and the machine body whereby when the radial gripper means is extended to engage a tunnel wall, the thrust means can move the machine body relative thereto, said gripper means when retracted being moveable longitudinally of the machine body.

4. A machine according to claim 1 wherein the means for erecting circular tunnel support structures comprises a transversely disposed circular framework mounting a chain which is driven around the framework and on which segments of ring girders are mounted and attached to each other in succession, and means for expanding the circular chain to enable location of the final segment.

5. A machine according to claim 4 wherein a carrier is mounted on a longitudinal structure which overlies the machine body to deliver segments of ring girders to the erection means.

6. A machine according to claim 5 wherein the longitudinal structure is adjustable longitudinally and vertically relative to the machine body.

7. A machine according to claim 1, wherein means is provided to limit the peripheral movement of the cutter boom to form arcuate profile.

* * * * *